United States Patent [19]

Kraus

[11] 4,088,041

[45] May 9, 1978

[54] ENERGY STORING FLYWHEEL DRIVE

[75] Inventor: Charles E. Kraus, Austin, Tex.

[73] Assignee: Incelermatic, Inc., Austin, Tex.

[21] Appl. No.: 750,363

[22] Filed: Dec. 13, 1976

[51] Int. Cl.$^2$ .................. G05G 1/00; G05G 3/00; F16H 15/50
[52] U.S. Cl. .................................. 74/572; 74/796
[58] Field of Search ............ 74/572, 573, 573 F, 74/751, 796; 310/261, 262, 271, 43, 74

[56] References Cited

U.S. PATENT DOCUMENTS

| 2,093,042 | 9/1937 | Fottinger | 74/572 |
|---|---|---|---|
| 3,296,894 | 1/1967 | Moan | 74/572 X |
| 3,516,305 | 6/1970 | Chery | 74/796 |
| 3,665,788 | 5/1972 | Nyman | 74/572 X |
| 3,670,595 | 6/1972 | Chery | 74/796 X |
| 3,983,738 | 10/1976 | Vlasov et al. | 74/572 X |

FOREIGN PATENT DOCUMENTS

| 2,353,117 | 4/1975 | Germany | 74/572 |
|---|---|---|---|
| 1,079,181 | 4/1960 | Germany | 310/74 |
| 506,705 | 3/1976 | U.S.S.R. | 74/572 |

OTHER PUBLICATIONS

"Product Engineering" Magazine, p. 66, vol. 29, No. 33, Aug. 18, 1958.
"Scientific American" Magazine, pp. 22–23, Article entitled "Flywheels" by Richard Post & Stephen Post.

Primary Examiner—Samuel Scott
Assistant Examiner—Don E. Ferrell

[57] ABSTRACT

An energy storing flywheel drive including first and second flywheels rotatably supported in a housing for rotation about a common axis and operatively connected to a common shaft through respectively first and second planetary type traction roller transmissions, the first flywheel being connected to the sun member and the input-output shaft being associated with the planetary members of the first planetary transmission while its outer ring member is mounted in the housing and the second flywheel is connected to the sun member and the input-output shaft is connected to the outer ring member of the second planetary transmission while its planetary members are mounted on the housing thereby to cause, upon rotation of the input-output shaft, rotation of the flywheels in opposite directions, the transmission ratios of said planetary transmissions being so selected as to prevent the generation of gyroscopic forces.

15 Claims, 1 Drawing Figure

U.S. Patent     May 9, 1978     4,088,041
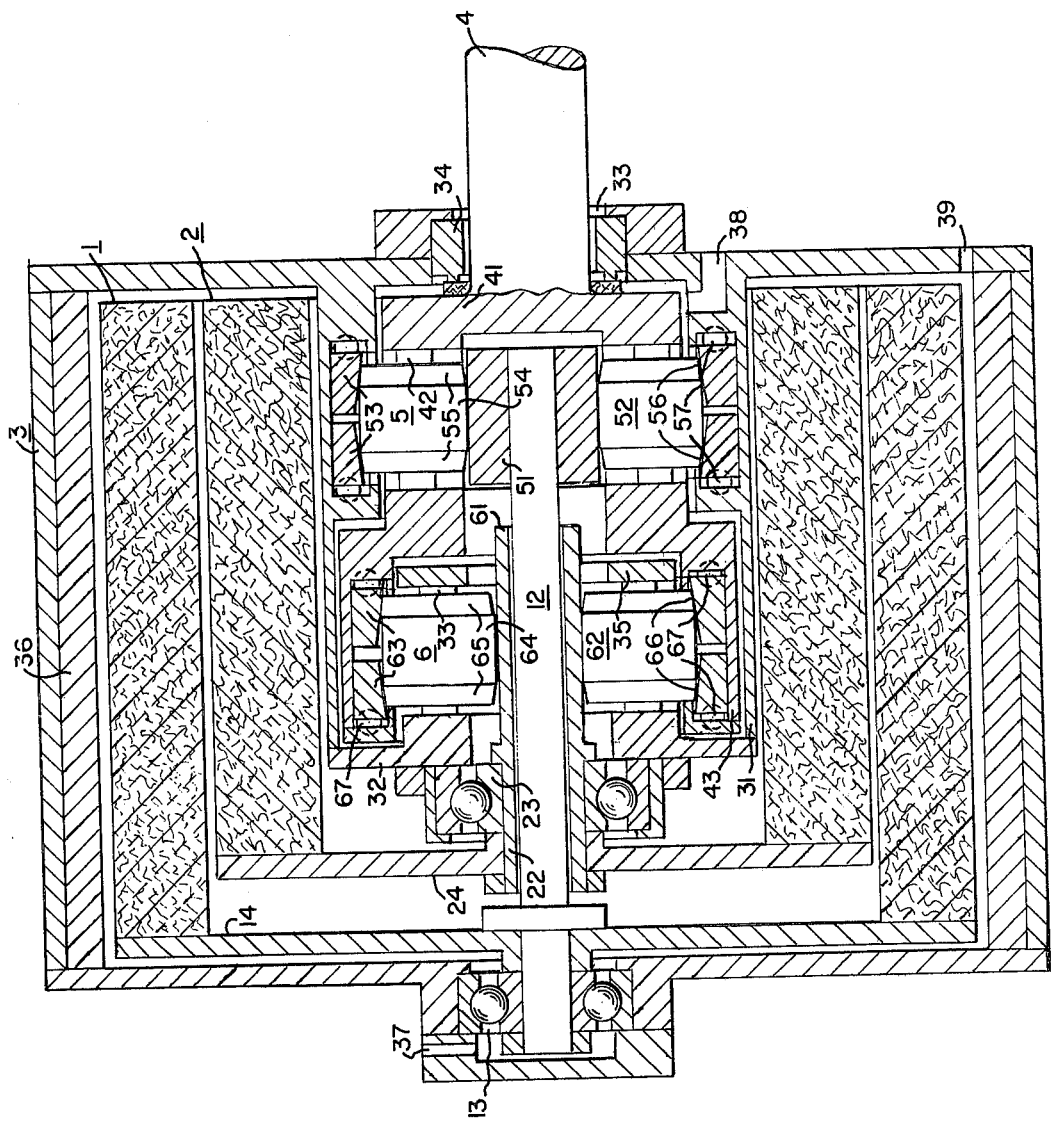

ENERGY STORING FLYWHEEL DRIVE

BACKGROUND OF THE INVENTION

1. Field of the Invention

The invention relates to energy storing flywheel drives which include two counter-rotating flywheels so supported as to permit tilting of the drives inspite of the gyroscopic forces generated by such tilting.

2. Description of the Prior Art

Flywheel drives can store large amounts of energy, which can be utilized in relatively short periods but flywheels will also generate large gyroscopic forces if their shaft is tilted. In many applications, such gyroscopic forces are disturbing if not unacceptable.

Therefore, flywheel drives have been developed in which two counter-rotating flywheels are used to store the energy wherein both flywheels generate identical but oppositely directed gyroscopic forces which balance each other. Such drives can be tilted rather easily since there are no forces apparent which would prevent rapid tilting of the drive. However, the gyroscopic forces generated within such drives are, nevertheless, present as large internal forces which require extremely heavy bearings and strong housing portions for supporting the bearings.

SUMMARY OF THE INENTION

In an energy storing flywheel drive the flywheel is rotatably supported at least partially by a planetary type traction roller transmission used, at the same time, as an input-output drive means for supplying energy to, and retrieving it from, the flywheel.

If two counter-rotating flywheels are used the flywheels are operatively connected to a common input-output shaft through first and second planetary type traction roller transmissions and are rotatably supported preferably in a housing on two concentric shafts connected to the sun rollers of the first and second planetary type transmissions respectively. The ring member of the first transmission is mounted on the housing and its planetary members are mounted on the input-output shaft for rotation of the first flywheel in one direction and the planetary members of the second transmission are mounted on the housing while its ring member is mounted for rotation with the input-output shaft for rotation of the second flywheel in the opposite direction. The transmission ratios of the planetary type transmissions are preferably so selected as to generate, during rotation of the flywheels, essentially identical but counteracting gyroscopic forces.

In this arrangement, the planetary type traction roller transmissions not only transmit the power between the flywheels and the input-output shaft but also form powerful roller bearings capable of withstanding the large gyroscopic forces acting between the counter-rotating flywheels upon tilting of the flywheel drive.

BRIEF DESCRIPTION OF THE DRAWINGS

The sole FIGURE is a cross-sectional view of a flywheel drive having counter-rotating cylindrical flywheels connected to a common shaft through planetary traction roller transmissions received within the flywheels.

As shown in the FIGURE, the flywheel drive consists of first and second flywheels 1 and 2 rotatably mounted in a housing 3. The first flywheel 1 is operatively connected to an input-output shaft 4 through a first planetary transmission 5 and the second flywheel 2 is operatively connected to the same shaft 4 through a second planetary transmission 6 for supplying energy to, and retrieving it from, the flywheels 1 and 2.

The planetary transmissions as shown in the drawing are traction roller planetary transmissions as described in copending U.S. application Ser. No. 704,438 to which reference is made for a description of the traction roller transmissions in detail. Basically, however, the planetary traction roller transmissions each consist of a sun roller, a ring structure forming a circular race surrounding the sun roller in radially spaced relationship therefrom and a number of planetary traction rollers disposed in the annular gap between the sun roller and the circular race and in frictional engagement with both the sun roller and the circular race.

The input-output shaft 4 of the flywheel drive has, within the housing 3, a flange 41 provided with axial studs 42 on which the planetary rollers 52 are rotatably supported between the sun roller 51 and the ring structures 53. The ring structures 53 are mounted in an interior housing cylinder 31 and are only slightly movable therein for the purpose of forcing the rings 53 toward each other so as to compress the traction rollers thereby forcing them into firm engagement with the traction ring structure 53 and the sun roller 51 when a torque is transmitted through the transmission. The sun roller 51 is mounted on the shaft 12 of the first flywheel 1 for rotation therewith. The shaft 12 is supported at one end in the housing 3 by bearing 13 and at the other end by the sun roller 51 through the traction rollers 52. The traction rollers 52 can carry heavy bearing loads and they are in fact also used as bearings for the input-output shaft 4 which, at this end, extends through opening 33 in the housing 3, with only a face seal arrangement 34 disposed in the opening 33.

The first flywheel 1 is mounted on the shaft 12 by a disc 14 connected to, or integral with, the flywheel 1. The second flywheel 2 is nested within flywheel 1 and has its disc 24 mounted on a hollow shaft 22 surrounding the flywheel shaft 12. The hollow shaft 22 is supported by a bearing 23 mounted on a support disc 32 at the inner end of the housing cylinder 31. The hollow shaft 22 extends into the second planetary transmission 6 and forms the sun roller 61 for the second planetary transmission 6. The traction rollers 62 of the second planetary transmission 6 are rotatably supported by studs 33 extending between the support disc 32 and an annular reinforcement disc 35. The traction rollers 62 are therefore rotatably supported by the housing directly and form another bearing for the hollow shaft 22 and, at the same time, for the inner end portion of the input-output shaft 4 which carries the ring structures 63 of the second traction roller transmission 6. The ring structures 63 are mounted in a drum 43 which is integral with, or connected to, the input-output shaft 4 through the studs 42 supporting the traction rollers 52 of the first planetary transmission 5.

The traction rollers 52 and 62 of both traction roller transmissions have cylindrical center portions 54 and 64 with slightly conical edge portions 55 and 65. The cylindrical center portions 54, 64 are in frictional engagement with the respective sun rollers 51 and 61 and the conical edge portions 55 and 65 are in frictional engagement with the respective ring structures 53 and 63 which have corresponding conically shaped inner surfaces 56 and 66. The ring structures 53 and 63 are furthermore rotatably supported and wedging cam arrangements 57 and 67 are disposed at their axially outer ends which force the ring structures toward each other to cause engagement of the traction rollers with the ring structures and the sun rollers upon transmission of a torque through the transmission.

For safety reasons the housing 3 has a containment ring 36 which retains parts of the flywheels in case of their rupture at high speeds. The housing 3 also has lubricant and air discharge passages 37, 38, 39 for discharging lubricant and cooling air from the drive. The lubricant is sprayed by spray devices (not shown) in a fine spray directly into the bearings and other friction areas because of the high speeds of the various elements. The discharge passages 37, 38, 39 are connected to suction lines (not shown) to remove any superfluous lubricant to avoid its interfering with the flywheels.

During operation of the flywheel drive as an energy storage device, the shaft 4 is normally connected to an infinitely variable speed transmission which is capable of gradually increasing the speed of shaft 4 for speeding up the flywheels in opposite directions of rotation and to change the transmission ratio for a decrease in flywheel speed when the energy stored in the flywheels is needed.

Rotation of the input-output shaft 4 in one direction causes the traction rollers 52 to roll on the ring structures 53 and rotate the sun roller 5 and with it the first flywheel 1 at increased speed in the same direction as shaft 4. Rotation of the input-output shaft 4 in the one direction also causes rotation of the ring structure 63 of the second planetary transmission. The ring structure 63 drives the traction rollers 62 at increased speed in the same direction and the traction rollers 62 rotate the sun roller 61 and with it the second flywheel in the opposite direction. If, as shown in the drawing, the second flywheel is nested within the first flywheel the transmission ratios of the traction roller transmissions are so selected that the second flywheel rotates at greater speed then the first flywheel such that the gyroscopic forces of the two counterrotating flywheels are balanced. For example, the top speed of the first flywheel may be 52,000 rpm while the top speed of the second flywheel is, at the same time, 65,000 rpm and in the opposite direction. The selection of the transmission ratio depends, of course on the flywheel design which may be in a form other than shown although the nested arrangement of the counter rotating flywheels with the transmissions disposed within the inner flywheel provides a very compact drive arrangement.

The drive arrangement as described is usable as a relatively inexpensive powerful energy storage device which, although using flywheels, is insensitive to position changes since the forces generated by such changes are internally balanced and are balanced between the counter rotating flywheels as directly as possible and mainly through the traction roller transmissions which, designed to transmit large momentary power requirements, represent also high capacity roller bearings which can easily withstand the bearing loads generated by gyroscopic forces upon tilting of the flywheel drive. The drive can be used, for example, as an emergency power supply for a helicopter to whose turbine it may be connected by a continuously variable traction drive having a working speed range of for example 4 to 1. In such an application the flywheels are maintained at full speed during normal operation of the turbine with the transmission ratio of the continuously variable traction drive being varied as the turbine speed is varied during normal flying. Upon loss of turbine power, the helicopter pilot can, when nearing the ground, utilize the energy stored in the flywheel drive by changing the flywheel drive ratio to reduce the flywheels speed to one-fourth thereby releasing about 94% of the power stored in the flywheels and providing, for example, 375 hp for 10 seconds allowing the helicopter a safe landing.

Such drives are also useful in numerous applications where sudden power surges are desired while a continuous but relatively small power supply is available from which the flywheel drive can be charged over a period of time.

The invention is, of course, not limited to the particular arrangement as described with reference to the drawing. The flywheels could, for example, be parallel discs or they could be axially adjacent counter-rotating cylinders which, together, enclose the drive arrangement.

Therefore, whenever "flywheel" is used it is intended to include equivalent and alternative loads such as propellers and others mentioned in the specification.

It is also noted that the present invention is described on the basis of a drive including counter-rotating flywheels only because, in such drives, the problem to be solved by the present invention is particularly acute since these drives can be easily tilted if the counter-rotating flywheels are rotating at such speeds that their gyroscopic forces are balanced.

However, the invention may also be advantageously utilized in flywheel drives in which the gyroscopic forces generated by the flywheel when tilted are not balanced such as in single flywheel drives.

What is claimed is:

1. An energy storing flywheel drive, comprising: a housing; a flywheel rotatably supported in said housing; and input-output drive means for supplying energy to, and retrieving it from, said flywheel, said input-output drive means including a planetary type traction roller transmission mounted in said housing so as to form also a bearing for rotatably supporting said flywheel.

2. An energy storing flywheel drive as recited in claim 1, wherein two counter-rotating flywheels are disposed in said housing and connected to a common input-output shaft through planetary type traction roller transmissions which also rotatably support said flywheels in said housing.

3. An energy storing flywheel drive, comprising: a housing; first and second counter rotating flywheels mounted in said housing for rotation about a common axis; an input-output shaft coaxial with the axis of said flywheels; and first and second planetary type transmissions operatively connecting, respectively, said first and second flywheels with said input-output shaft, each consisting of a sun member; a ring member surrounding the sun member in spaced relationship; and planetary members disposed in the space between, and in engagement with, the sun and ring members, said first transmission having its ring member associated with the housing, its planetary members mounted on said input-output shaft and its sun member operatively connected to said first flywheel so as to provide support for rotation of said first flywheel in the same direction as said input-output shaft, and said second transmission having its ring member connected for rotation with the input-output shaft, its planetary members mounted on said housing and its sun member operatively connected to said second flywheel so as to provide support for rotation of said second flywheel in a direction opposite to that of said input-output shaft the transmission ratios of said first and second transmissions being so selected as to cause the flywheels to generate, upon tilting of the flywheel drive, counteracting gyroscopic forces which essentially cancel one another.

4. An energy storing flywheel drive as recited in claim 3, wherein said input-output shaft has studs extending through the annular space between the sun and the ring members of said first planetary type transmission and rotatably supporting the planetary members of said first transmission, a drum is connected to the free ends of said studs for rotation with said input-output shaft, the ring member of said second planetary type transmission being mounted in, and for rotation with, said drum.

5. An energy storing flywheel drive as recited in claim 3, wherein said first and second planetary type transmissions are traction roller transmissions whose sun members are sun rollers, whose planetary member are planetary traction rollers each having a cylindrical main surface area in contact with the sun roller and conical outer areas, and whose ring members are traction rings of conical shape which are in contact with the conical outer areas of the traction rollers and so movably disposed in the housing as to be forced toward each other when a torque is transmitted through the transmission thereby to cause firm engagement of the traction rollers with the traction rings and the sun rollers.

6. An energy storing flywheel drive as recited in claim 3, wherein said second flywheel is mounted on a hollow shaft connected to the sun member of said second transmission and said first flywheel is mounted on a central shaft coaxial with, and extending through, said hollow shaft and connected to the sun member of said first transmission.

7. An energy storing flywheel drive as recited in claim 6, wherein said first and second flywheels are cylindrical and disposed axially adjacent each other so as to surround a cylindrical cavity and said first and second transmissions are received in said cylindrical cavity.

8. An energy storing flywheel drive as recited in claim 6, wherein said first and second flywheels are cylindrical and nested within each other and said first and second transmissions are received within the inner flywheel.

9. An energy storing flywheel drive comprising: a housing; first and second counter-rotating flywheels mounted in said housing on concentric shafts for rotation about a common axis; an input-output shaft coaxial with the axis of the flywheels; and first and second planetary type traction roller transmissions operatively connecting respectively, the first and second flywheels with said input-output shaft each consisting of a sun roller, a ring member surrounding the sun roller in spaced relationship and planetary traction rollers disposed in the space between, and in engagement with, the sun roller and the ring members, said first transmission having its ring members supported on the housing, its planetary rollers rotatably supported by studs mounted on said input-output shaft and extending through the annular space between the sun roller and the ring member, and its sun roller mounted on the shaft of said first flywheel for rotation therewith, said second transmission comprising a drum connected to the studs of said first transmission for rotation with said input-output shaft, said drum housing the ring members of the second transmission with its planetary traction rollers mounted on support studs carried by said housing and its sun roller mounted on the shaft of said second flywheel, the transmission ratios of said first and second traction roller transmission being so selected as to generate, upon rotation of said flywheels in opposite directions, essentially equal but opposed gyroscopic forces.

10. An energy storing flywheel drive as recited in claim 9, wherein said second flywheel is mounted on a hollow shaft connected to the sun roller of said second transmission and said first flywheel is mounted on a central shaft coaxial with, and extending through, said hollow shaft and connected to the sun roller of said first transmission.

11. An energy storing flywheel drive as recited in claim 9, wherein said first and second flywheels are cylindrical and disposed axially adjacent each other so as to define a cylindrical cavity and said first and second transmissions are received in said cylindrical cavity.

12. An energy storing flywheel drive as recited in claim 9, wherein said first and second flywheels are cylindrical and nested within each other and said first and second transmissions are received within the inner flywheel.

13. A traction roller drive comprising: a housing; first and second counter rotating loads mounted on concentric shafts for rotation about a common axis; an input shaft coaxial with the axis of the loads; and first and second planetary type traction roller transmissions operatively connecting respectively, the first and second loads with said input shaft, each consisting of a sun roller, a ring member surrounding the sun roller in spaced relationship and planetary traction rollers disposed in the space between, and in engagement with, the sun roller and the ring members, said first transmission having its ring members supported on the housing, its planetary rollers rotatably supported by studs mounted on said input shaft and extending through the annular space between the sun roller and the ring member, and its sun roller mounted on the shaft of said first load for rotation therewith, said second transmission comprising a drum connected to the studs of said first transmission for rotation with said input shaft, said drum housing the ring members of the second transmission with its planetary traction rollers being mounted on support studs carried by said housing and its sun roller being mounted on the shaft of said second load.

14. A traction roller drive as recited in claim 13, wherein said second load is mounted on a hollow shaft connected to the sun roller of said second transmission and said first load is mounted on a central shaft coaxial with, and extending through, said hollow shaft and connected to the sun roller of said first transmission.

15. A traction roller drive as recited in claim 13, wherein said first and second loads are propellers disposed axially adjacent each other.

* * * * *